US008576929B2

(12) United States Patent
Abad Molina et al.

(10) Patent No.: US 8,576,929 B2
(45) Date of Patent: Nov. 5, 2013

(54) POWERLINE COMMUNICATION DEVICE (75) Inventors: Jose Abad Molina, Rincón de la Victoria (ES); Jonathan Ephraim David Hurwitz, Edinburgh (GB)

(73) Assignee: Broadcom Corporation, Irvine, CA (US)

( * ) Notice: Subject to any disclaimer, the term of this patent is extended or adjusted under 35 U.S.C. 154(b) by 22 days.

(21) Appl. No.: 13/246,433

(22) Filed: Sep. 27, 2011

(65) Prior Publication Data
US 2013/0003874 A1 Jan. 3, 2013

Related U.S. Application Data (60) Provisional application No. 61/503,060, filed on Jun. 30, 2011.

(51) Int. Cl.
*H04B 3/00* (2006.01)

(52) U.S. Cl.
USPC ........ 375/257; 375/260; 375/267; 340/12.32; 340/13.23; 340/538

(58) Field of Classification Search
USPC ...................... 340/12.32, 13.23, 538, 310.01; 375/260, 267, 257
See application file for complete search history.

(56) References Cited

U.S. PATENT DOCUMENTS

| 2003/0038710 | A1* | 2/2003 | Manis et al. ............. 340/310.01 |
| 2005/0085259 | A1 | 4/2005 | Conner |
| 2005/0136972 | A1 | 6/2005 | Smith |
| 2007/0076666 | A1* | 4/2007 | Riveiro et al. ................ 370/335 |
| 2007/0230498 | A1 | 10/2007 | Fujiwara |

FOREIGN PATENT DOCUMENTS

| WO | 2007/039723 A1 | 4/2007 |
| WO | 2009/048177 A1 | 4/2009 |

OTHER PUBLICATIONS

European Patent Office; European Search Report; EP Application No. 12004783.2; Nov. 7, 2012; 4 pgs.
Oksman, et al.; G.hn: The new ITU-T home networking standard; IEEE Communications Magazine; vol. 47, Issue 10; Oct. 2009; pp. 138-145.

* cited by examiner

*Primary Examiner* — Daniel Washburn
*Assistant Examiner* — Rahel Guarino
(74) *Attorney, Agent, or Firm* — Garlick & Markison; Bruce E. Garlick (57) ABSTRACT

A Powerline Communications (PLC) device includes a processing module, memory coupled to the processing module, and a PLC interface coupled to the processing module. The PLC device transmits a plurality of PLC queries, two of the plurality of PLC queries complying with differing and incompatible PLC communication standards. It then receives a plurality of responses from a plurality of other PLC devices, two responses received from respective PLC devices complying with two differing and incompatible PLC communication standards. The PLC device then directs each of the two PLC devices to transmit communications of the differing and incompatible PLC communication standards in an attempt to avoid PLC communication conflicts. The PLC device may establish non-PLC communications with a remote communications device. The PLC device may bridge communications between remote PLC devices and between a remote PLC device and a remote non-PLC device.

24 Claims, 10 Drawing Sheets

POWERLINE COMMUNICATION DEVICE

CROSS-REFERENCE TO PRIORITY APPLICATION

This application claims priority under 35 U.S.C. §119(e) to U.S. Provisional Application Ser. No. 61/503,060 filed Jun. 30, 2011, which is incorporated herein by reference in its entirety.

BACKGROUND OF THE INVENTION

1. Field of the Invention

The present invention relates to powerline communications and in particular, powerline communication devices, and systems of use therefore.

2. Description of the Related Art

With the growing need for the exchange of digital content (e.g. MP3 audio, MPEG4 video and digital photographs) there is a widely recognized need to improve digital communication systems. Powerline communication (PLC) is a technology that encodes data in a signal and transmits the signal on existing electricity powerlines in a band of frequencies that are not used for supplying electricity. Accordingly, PLC leverages the ubiquity of existing electricity networks to provide extensive network coverage. Furthermore, since PLC enables data to be accessed from conventional power-outlets, no new wiring needs to be installed in a building (or different parts of a building). Accordingly, PLC offers the additional advantage of reduced installation costs.

Figure 1:
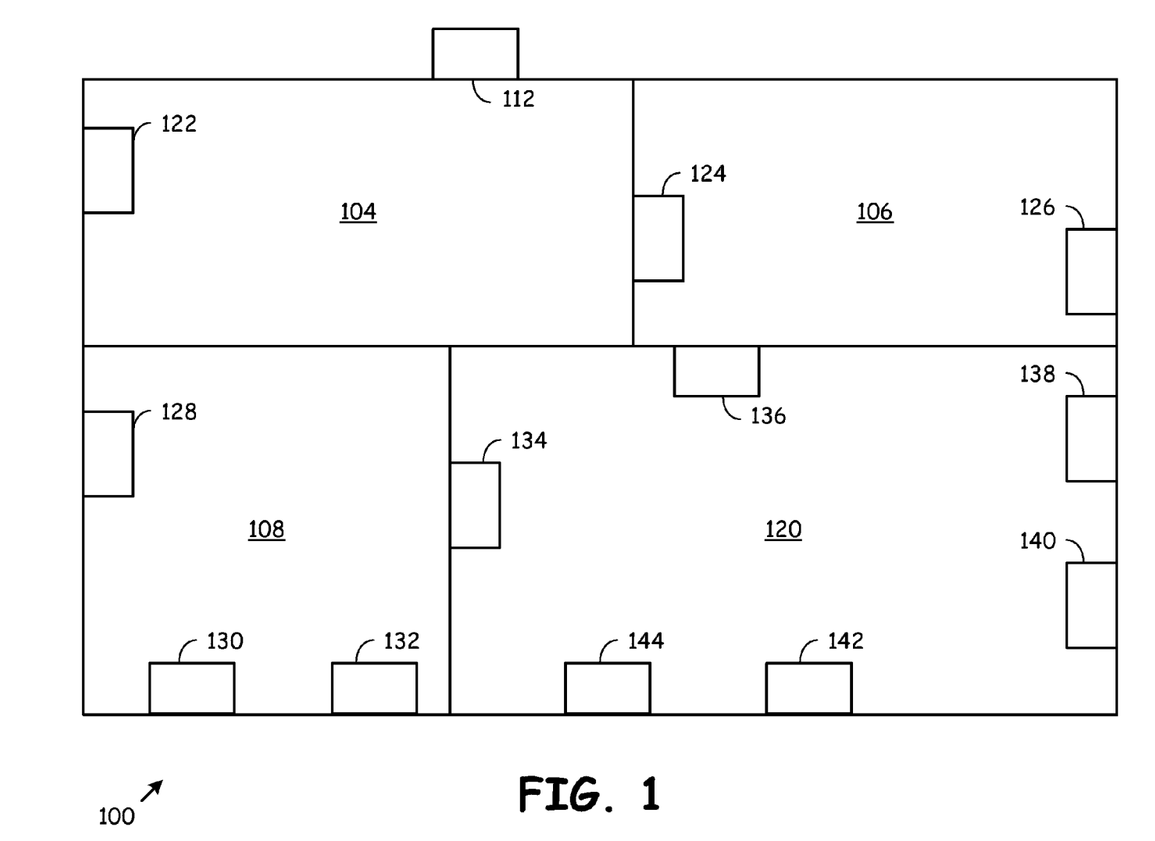
FIG. 1 is a block diagram illustrating a household having a plurality of power outlets.

Referring to FIG. 1, a household 100 typically has a distributed mains wiring system (not shown) consisting of one or more ring mains, several stubs and some distribution back to a junction box 112. In other constructs the distributed mains wiring system has a breaker box with circuits routed there from in a star configuration. For the sake of example, the household 100 has four rooms 104, 106, 108, and 120. Each room 104, 106, 108, and 120 may have a different number of outlets and other mains connections. For example, room 104 may have only one connection 122, room 106 may have two connections 124, 126, room 108 may have three connections 128, 130, 132 and room 120 may have six connections 134, 136, 138, 140, 142, 144.

Accordingly, there are a variety of distances and paths between different power outlets in the household 100. In particular, the outlets most closely located to each other are those on multi-plug strips, and the outlets furthest away from each other are those on the ends of stubs of different ring mains (e.g. power outlets in the garden shed and the attic). Communication between these furthest outlets typically passes through the junction box 112. Nonetheless, the majority of outlets associated with a particular application (e.g. Home Cinema) are normally located relatively close together.

Because the channel capacity of a powerline and connectors attenuates according to, amongst other features, the frequency of a transmitted signal, current generation PLC systems have been developed to transmit signals at relatively low frequencies (i.e. below 30 MHz) and thereby obtain suitable transmission distances. However, the use of such low transmission frequencies limits the maximum data throughput obtainable by PLC systems. Only recently have powerline systems extended beyond 30 MHz, which causes problems due to regulations that require lower injected power above 30 MHz. This requirement places additional demands on the dynamic range of transceivers servicing PLC communications in these higher frequency ranges.

The processes of receiving analog signals and injecting modulated signals are treated differently by different PLC communication standards. A number of powerline communication standards have been defined. These include the Homeplug 1.0/1.1 standards, the Homeplug AV standard, the CEPCA standard, the Digital Home Standard, IEEE 1901, and ITU-T G.9960. Current PLC approaches often include some analog conditioning to the signal-path (e.g., low-pass filtering for anti-aliasing or smoothing, or AC coupling to remove the low-frequency [<<1 KHz] high voltage content of the electricity mains). However, because differing PLC communication standards support differing communication bands, differing modulations, channel bandwidths, etc., PLC devices typically service only a single PLC communication standard. In common with most communication systems, one of the main problems with prior art PLC systems is obtaining high throughput and wide coverage at reasonable implementation cost, whilst maintaining compatibility with existing technologies. There is, therefore, a need for improved PLC systems that overcome the above and other problems.

Communications within the household 100 or within other premises may also be serviced by a Wireless Local Area Network (WLAN), a cellular network, millimeter wave communications, e.g., 60 GHz, Wireless Personal Area Network (WPAN), Cable Modem Network, Local Area Network (LAN), and other communication techniques. Each of these communication types has its respective benefits and shortcomings. None of these communication types is typically able to provide a full coverage solution within the household 100 (or other premises). The shortcoming of all wired technologies is the lack of mobility thereof. Shortcomings of all wireless technologies are coverage holes, which are typical, interference from other wireless devices, including competing wireless devices, Radar, etc., and bandwidth limitations.

DETAILED DESCRIPTION

Figure 2:
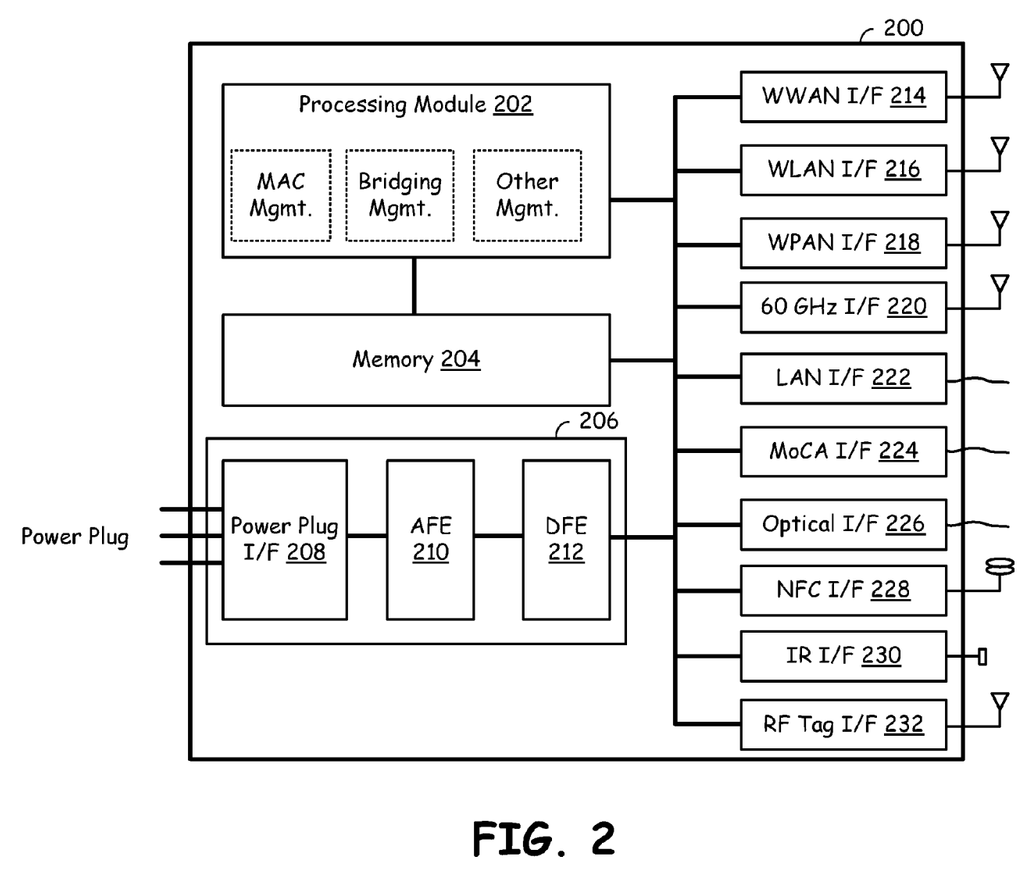
FIG. 2 is a block diagram illustrating a Powerline Communication (PLC) device constructed according to one or more embodiments of the present invention.

FIG. 2 is a block diagram illustrating a Powerline Communications (PLC) device constructed according to one or more other embodiments of the present invention. The PLC device 200 supports PLC operations according to one or more PLC communication standards. The PLC device 200 may be coupled to a power plug, e.g., into a wall plug 122, 124, 126, 128, 130, 132, 134, 136, 138, 140, 142, or 144 of FIG. 1. The PLC device 200 performs/supports the various operations and includes the various structures further described herein according to one or more embodiments of the present invention. In some embodiments, the PLC device 200 may be permanently installed within a home or other premises.

The PLC device 200 includes a PLC interface 206 that includes a power plug interface 208, an Analog Front End (AFE) 210, and a Digital Front End (DFE) 212. Generally the AFE 210 includes analog signal processing elements while the DFE 212 includes digital signal processing elements. At least one Analog to Digital Converter (ADC) and at least one Digital to Analog Converter (DAC) service analog to digital and digital to analog signal conversion operations, respectively. Various components of the PLC interface 206 as they relate to embodiments of the present invention will be described further herein.

The PLC device 200 also includes one or more other communication interfaces, including a Wireless Wide Area Network (WWAN) interface 214, e.g., a WiMAX interface, a Wireless Local Area Network (WLAN) interface 216, e.g., an 802.11x interface, a Wireless Personal Area Network (WPAN) interface 218, e.g., a Bluetooth interface, a 60 GHz interface 220 (millimeter wave interface), a Local Area Network (LAN) interface 222, e.g., an Ethernet interface, a cable interface, e.g. Multimedia over Coax Alliance (MoCA) interface 224, an optical interface 226, a Near Field Communication (NFC) OF 228, an Infra-Red OF 230, and/or an RF Tag OF 232. The user should appreciate that the PLC device 200 may bridge communications between a power plug and one or more devices, e.g., between the power plug and a desktop computer, a laptop computer, a touchpad computer, an appliance, a television, another entertainment system device, etc., via the PLC interface 206 and one or more of the other communication interfaces 214, 216, 218, 220, 222, 224, 226, 228, 230, and/or 232.

The processing module 202 may include one or more of a system processor, a digital signal processor, a processing module, dedicated hardware, an application specific integrated circuit (ASIC), or other circuitry that is capable of executing software instructions and for processing data. In particular, the processing module 202 is operable to support Medium Access Control (MAC) management, communications bridging management, and other management of the communications circuitry of the PLC device 200. The memory 204 may be RAM, ROM, FLASH RAM, FLASH ROM, optical memory, magnetic memory, or other types of memory that is capable of storing data and/or instructions and allowing processing circuitry to access same. The processing module 202 and the memory 204 supports operations of embodiments of the present invention as further described herein.

Figure 3:
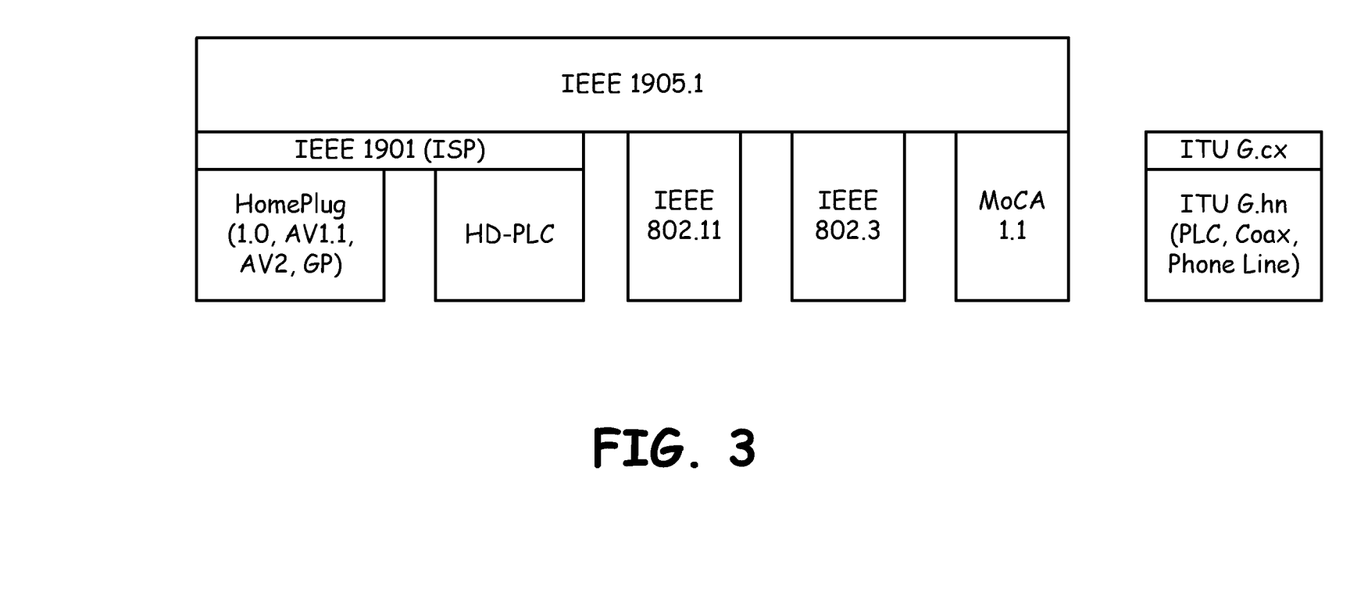
FIG. 3 is a block diagram illustrating various PLC (and other) communication standards that operate or are modified to operate according to one or more embodiments of the present invention.

FIG. 3 is a block diagram illustrating various PLC (and other) communication standards that operate or are modified to operate according to one or more embodiments of the present invention. Currently existing PLC communication standards include the HomePlug family of operations, including the 1.0, AV1.1, AV2, and GP operations, and the HD-PLC operations. Generally, the HomePlug family of PLC communication standards is incompatible with the HD-PLC communication standard. The HomePlug PLC communication standard is widely deployed while HD-PLC is primarily deployed in Japan.

The IEEE 1901 specification includes a newer PLC communication standard that has two different PHY layers, one based on OFDM modulation (interoperable with HomePlug AV1.1), and another based on Wavelet modulation (interoperable with HD-PLC). Each PHY layer is optional, and implementers of the communication standard may, but are not required to include both. Devices that use the OFDM PHY only would not interoperate with devices based on the Wavelet PHY. The OFDM PHY is derived from HomePlug AV.

The IEEE 1905.1 specification defines an abstraction layer for multiple home networking technologies. IEEE 1905.1 provides a common data and control Service Access Point to the heterogeneous home networking technologies described in the following specifications: IEEE 1901, IEEE 802.11x, IEEE 802.3x and Multimedia over Coax Alliance (MoCA) 1.1. The IEEE 1905.1 standard is extendable to work with other home networking technologies. The abstraction layer supports dynamic interface selection for transmission of packets arriving from any interface (upper protocol layers or underlying network technologies). End-to-end Quality of Service (QoS) is supported. Also specified are procedures, protocols and guidelines to provide a simplified user experience to add devices to the network, to set up encryption keys, to extend the network coverage, and to provide network management features to address issues related to neighbor discovery, topology discovery, path selection, QoS negotiation, and network control and management.

The IEEE 1905.1 layer resides between the media access control and Internet Protocol layers. The 1905.1 abstraction layer intends to make it easier to install and manage hybrid home networks and will also provide mechanisms for bridging data among different interfaces, i.e., plug and play.

ITU's G.hn specification is a competing counterpart to IEEE 1901 that primarily defines different ways to implement PHY and MAC layers of a PLC device. G.hn is a technology standard that enables service providers, consumer electronics companies, PC makers, and consumers to connect all types of devices via any wire in the home—coax cable, phone lines and powerlines.

There are a multitude of narrow and broadband PLC technologies beyond IEEE 1901 that already exist. For example, conventional tier two coexistence mechanisms are included in ISO/IEC 14908, G3 & G3 Lite, HP C&C, ISO/IEC 14543 which employ some form of CSMA/CA. Other PLC communication standard technologies do not support any type of coexistence other than tier one. Such standards include most current broadband PLC offerings, UPB, A10, INSTEON/X-10, Ariane Controls, CEBus, CEA 600.31, TDA 5051A, etc.

With all of these PLC communication standards potentially sharing the same powerline media and defining use of the same frequency bands, major problems arise depending on the particular installation. For example, if a consumer buys and installs current PLC components, they may not function, function inadequately, or may cause major problems with currently existing PLC components operating pursuant to other standards. A first tier of conventional coexistence involved PLC frequency spectrum allocation, which has failed because there is no controlling entity enforcing conformance (such as found with over the air transmissions and the FCC).

The industry is aware of first tier conventional coexistence failures, and is currently attempting to define a second tier conventional coexistence scheme to apply to all PLC communication standards. Basically, a second tier approach involves first identifying all standards that may exist within a current installation, and then equally splitting available resources (frequency band, available time, etc.) amongst them.

A problem with prior tier one and two coexistence schemes is that a first group of devices of a first standard might be rather inactive and could afford to lose available resources, while a second group of second standard devices might be very active and could benefit from more resources. The second group might also involve many more devices than that of the first group, or be involved in communication exchanges with much higher priority. Communication management operations supported by a PLC device of the present invention address these and additional problems.

Figure 4:
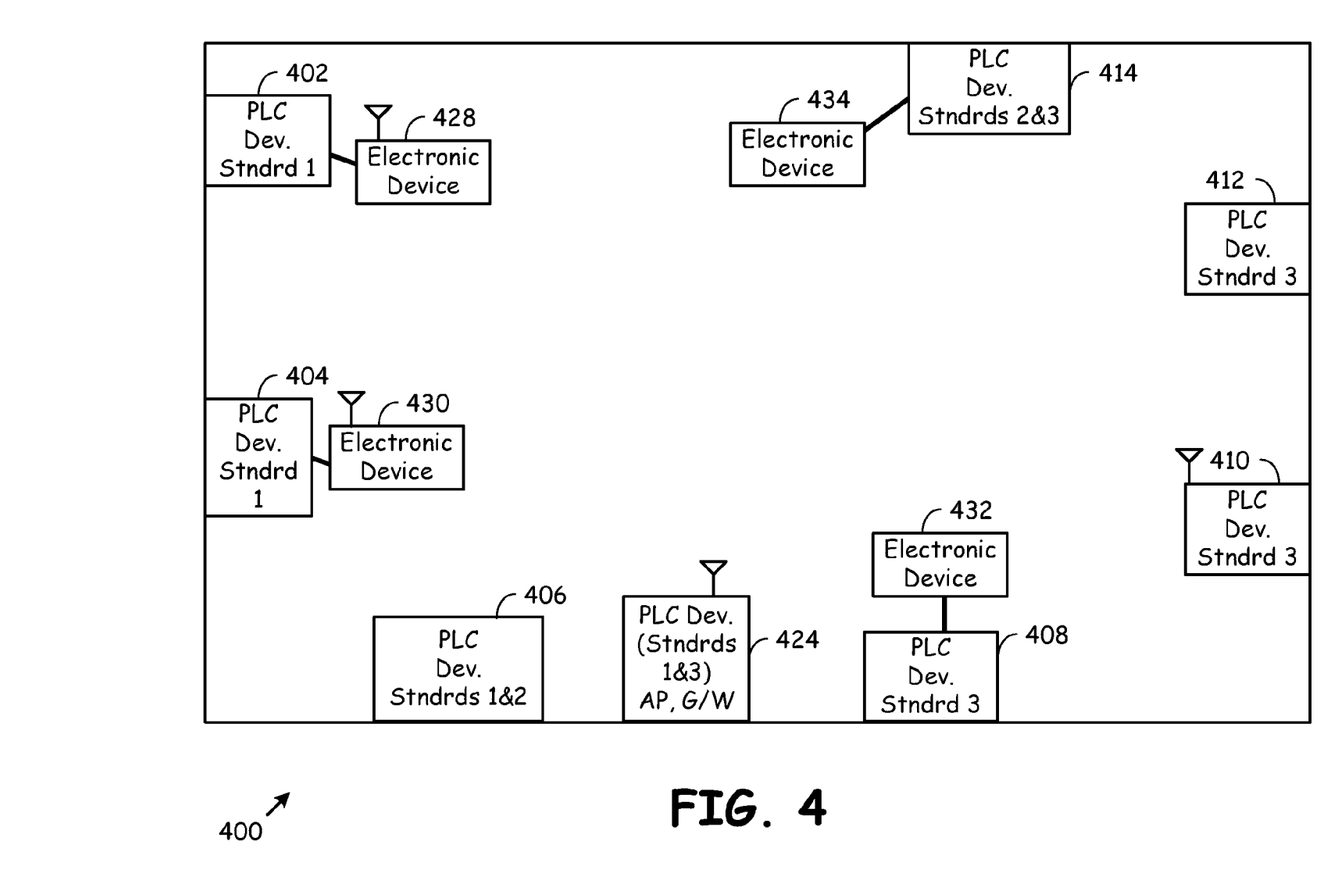
FIG. 4 is a system diagram illustrating a premises in which at least one PLC device resides that operates according to one or more embodiments of the present invention.

FIG. 4 is a block diagram illustrating a premises in which at least one PLC device resides that operates according to one or more embodiments of the present invention. The premises 400 may be a home, office building, apartment complex, hotel, industrial building, or another type of structure. In the particular example of FIG. 4, a WLAN access point 424 provides Internet access within the premises 400 and is also a PLC device constructed according to one or more embodiments of the present invention. Also shown within the premises 400 are a plurality of PLC devices 402, 404, 406, 408, 410, 412, and 414. One or more of these PLC devices 402, 404, 406, 408, 410, 412, and 414 may be provided by the premises 400 owner/operator while other of these PLC devices may be brought into the premises 400 by a customer. In particular, PLC device 402 services electronic device 428, PLC device 404 services device 430, PLC device 408 services electronic device 432, and PLC device 414 services electronic device 434. Each of these devices 428, 430, 432, and 434 may be owned by the premises 400 owner or may be owned by a premises 400 visitor.

According to one or more embodiments of the present invention, one or more of these PLC devices 402, 404, 406, 408, 410, 412, 414, and 424 supports one or more differing PLC communication standards. For example PLC device 402 supports PLC communication standard 1, PLC device 404 supports PLC communication standard 1, PLC device 406 supports PLC communication standards 1 and 2, PLC device 408 supports PLC communication standard 3, PLC device 410 supports PLC communication standard 3, PLC device 412 supports PLC communication standard 3, and PLC device 414 supports PLC communication standards 2 and 3, and PLC device 424 supports PLC communication standards 1 and 3. As will be further described herein the differing PLC communication standards may be wideband, narrowband, consistent with one another, and/or inconsistent with one another. These PLC communication standards may be one of the PLC communication standards described with reference to FIG. 3 or may be another PLC communication standard.

According to one or more embodiments of the present invention, one or more of the PLC devices 402, 404, 406, 408, 410, 412, 414, and 424 may serve as masters of the powerline media servicing the premises 400, may bridge communications across differing PLC communication standards, and/or may bridge communications between PLC communications and non-PLC communications. Several of these operations will be described herein subsequently. In some embodiments, each PLC standard will have a unique master, with differing PLC devices serving as masters for differing PLC communication standards. Likewise, each supported non-PLC communication standard may have its own master.

Figure 5:
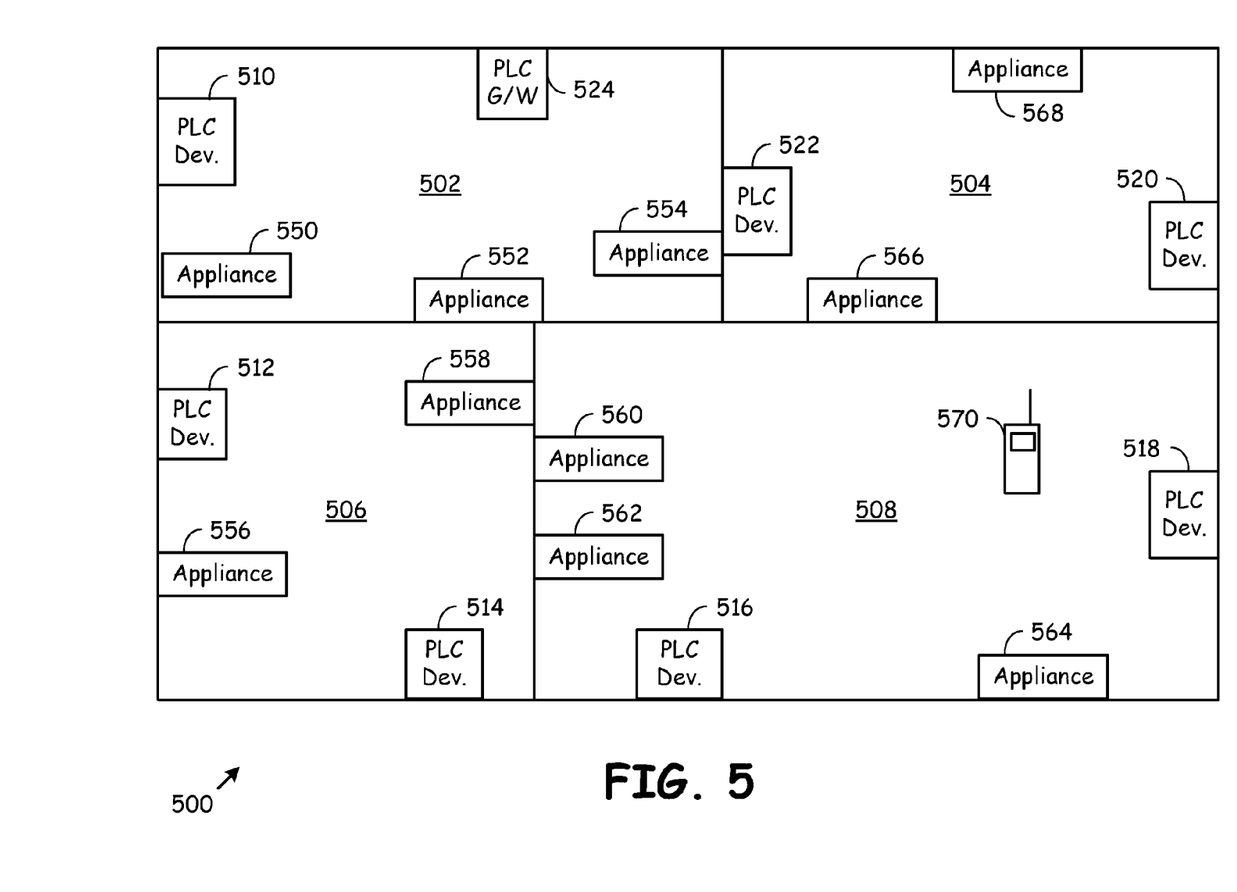
FIG. 5 is a system diagram illustrating a premises in which at least one PLC device resides that operates according to one or more embodiments of the present invention.

FIG. 5 is a block diagram illustrating a premises in which at least one PLC device resides that operates according to one or more embodiments of the present invention. The premises 500 may be a home, office building, apartment complex, hotel, industrial building, or another type of structure. The premises 500 includes a plurality of spaces 502, 504, 506, and 508, each of which may be a room, an apartment, an office, an industrial space, or another type of unit. Installed within the premises 500 are a plurality of PLC devices 510, 512, 514, 516, 518, 520, and 522. Also installed in the premises is a PLC device serving as a Gateway 524 for communications services. Each of the PLC devices 510-522 illustrated has a structure same or similar to the structure described with reference to FIGS. 2-4 and 6 and that operates according to the operations described with reference to FIGS. 7-10.

Also located in the premises 500 are a number of appliances 550, 552, 554, 556, 558, 560, 562, 564, 566, and 568. These appliances may be kitchen appliances such as refrigerators, freezers, stoves, ovens, dishwashers, trash compactors, small appliances, ice makers, etc. Further, these appliances may be office appliances such as computers, printers, scanners, monitors, etc. Further still these appliances could be industrial equipment, air conditioning units, heating units, ventilation units, fans, etc. The scope of the term appliance is not limited by the examples provided herein.

According to one aspect of the present invention, any of the PLC devices in the premises is capable of providing network service to the appliances along with node tagging support. One or more of the appliances may have a conventional tag, e.g., an RFID, NFC tag, one dimensional or two dimensional code, or another type of tag. One or more of the illustrated PLC devices has the ability to identify proximately located appliances (devices) using near field communication and/or RFIDs and/or bar codes. In such case, the device may query locally all potential RF tag enabled devices for response in identifying based thereupon. Further, near field communication may be employed by the device to identify proximately located devices. With each device labeled or identified, this information may be uploaded to a central location to at least logically map the location of these devices with the PLC device that does the querying.

This type of technique could be used to support "network in a box" functionality within a home or business. This network in a box may include RF tags for network enabled devices in the home (or simply load devices). This invention may also be extended with the use of wireless beam forming to further identify a fixed physical location of the devices with respect to other devices. By using wireless beam forming, the logical locations of each of the devices may be related to one another and the physical positioning of the beam forming technique.

According to a multi-communication technique installation within a home, one type of communication service may be wireless communications that are serviced by devices that bridge from a powerline communications communication link to a wireless link. For example, this type of device may provide 60 GHz wireless communications within a particular room. Further, another type of device may provide 802.11 communications with a particular part of the structure. Further, another bridging type device may bridge between PLC and Ethernet communications.

In such case, a software application is downloaded onto a phone 570 for use in mapping wireless services available within a home. The phone or tablet device 570 would have at least one wireless interface servicing WLAN or 60 GHz that would be able to determine service levels in all portions of the home/structure. In such case, the phone/tablet may also have a GPS receiver or another type of mapping location awareness that is employed for characterizing available communication services within the home. RFID/NFC tags associated with either or both the phone/tablet and a particular access point (powerline or otherwise) could interact along with position information to assist in generating such map. A user would enable the application and do a walkabout within the home to characterize communications characteristics that are available within various portions within the home. The data collected by the phone/tablet may be subsequently used to determine where additional points of communications are required, e.g. additional PLC/802.11 or PLC/60 GHz devices are required.

According to one aspect of the present invention, which will be described further with reference to FIGS. 6-10, a PLC device supports operations across multiple PLC communication standards. Each such multi-standard PLC node can be configured to perform virtual bridging in support of these operations. For example, an upstream DSL AP 524 provides IP connectivity (Internet access, wideband Media, Phone, etc.) and is configured internally to support a downstream PLC pathway that supports two competing PLC communication standard technologies. A user plugs in a first PLC bridging device 510 (operating further downstream pursuant to the first industry standard) to service a PC (not shown) via a CATS cable and PLC to Ethernet bridging. Next, a user plugs in a second PLC bridging device 512 (bridging PLC to WiFi) that supports both the first and second industry standards. At that point, the AP 524 switches from operating fully pursuant to the first industry standard to a slotted operation, toggling between the first standard and the second. Instead of the second PLC device 512 merely acting like the first PLC device 510 in selecting only one standard and slot in which to conform, it toggles back and forth between the first and second industry standards to take advantage of all available time domain bandwidth. To do so, however requires that communication addressing is maintained seamless throughout. This may be handled by supporting exchanges via one slot, while supporting exchanges via "virtual bridging" in the other (e.g., encapsulation and forwarding—or address substitution and forwarding).

Figure 6:
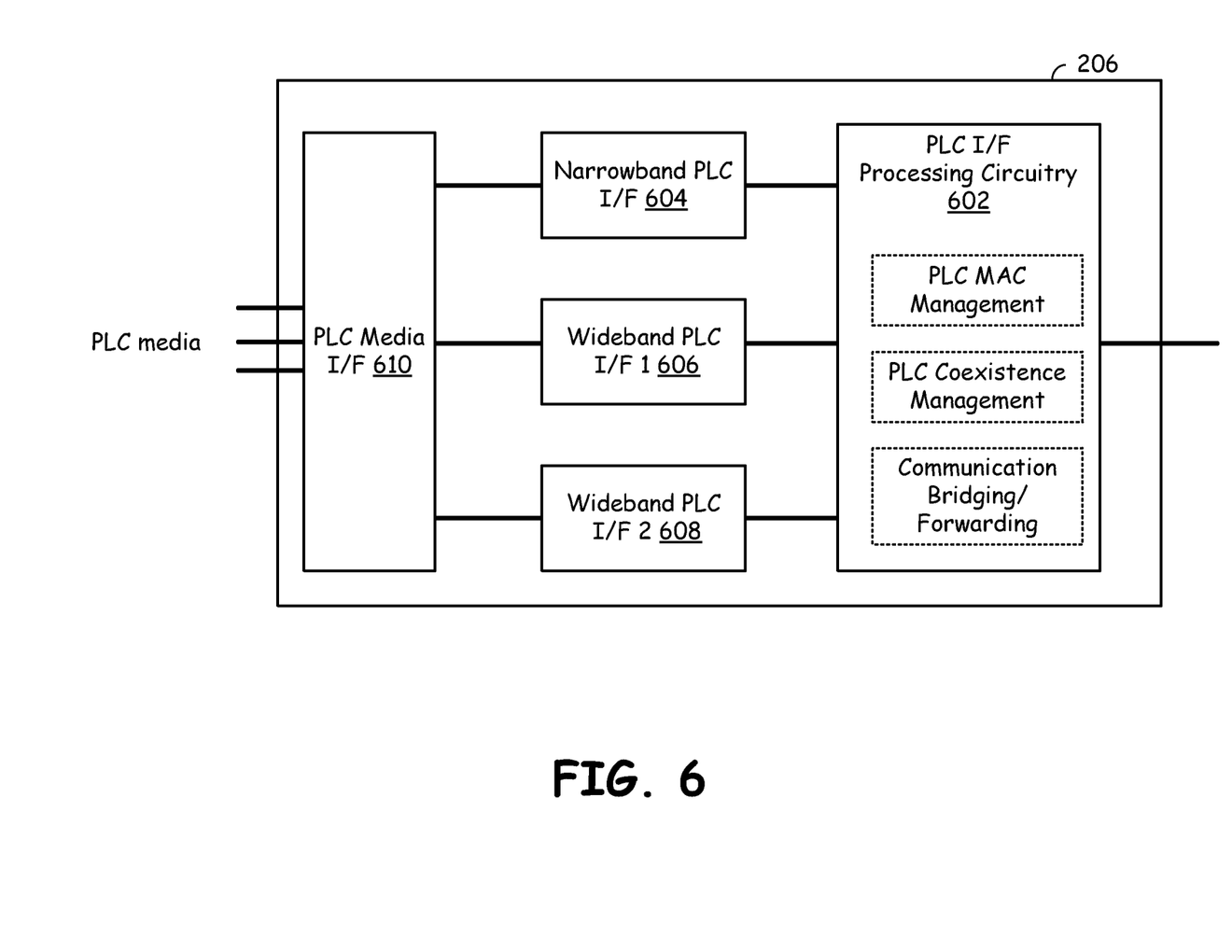
FIG. 6 is a block diagram illustrating a PLC interface that is capable of servicing multiple PLC communication standards and in bridging PLC communications between differing PLC communication standards according to one or more embodiments of the present invention.

FIG. 6 is a block diagram illustrating a PLC interface that is capable of servicing multiple PLC communication standards and in bridging PLC communications between differing PLC communication standards according to one or more embodiments of the present invention. The PLC interface 206 may be same/similar to the PLC interface 206 of FIG. 2, and is able to service a plurality of differing PLC communication standards. The PLC interface 206 includes PLC interface processing circuitry 602, a narrowband PLC interface 604, a first wideband PLC interface 606, a second wideband PLC interface 608, and a PLC media interface 610. The PLC media interface 610 couples PLC communications standard communication signals onto the PLC media and from the PLC media. The narrow band PLC interface 604 services narrowband PLC communication standard communications, e.g. according to one of the standards previously described. Both the first wideband PLC interface 606 and the second wideband PLC interface 608 service communications for at least one wideband PLC communication standard, such as one or more of the HPAV and G.hn standards previously described and according to one or more embodiments of the present invention.

PLC interface processing circuitry 602 supports operations previously described herein with reference to FIGS. 2-5, and that will further be described with reference herein to FIGS. 7-10. The PLC interface processing circuitry 602 executes operations for PLC MAC management, PLC core existence management, and communication bridging/forwarding. This functionality may be instantiated in hardware, software, or a combination of hardware and software. The PLC interface processing circuitry 602 may be a microprocessor, digital signal processor, specialized hardware, or a combination of these and/or other circuitry that is capable of performing the functionality described herein with reference thereto.

Figure 7:
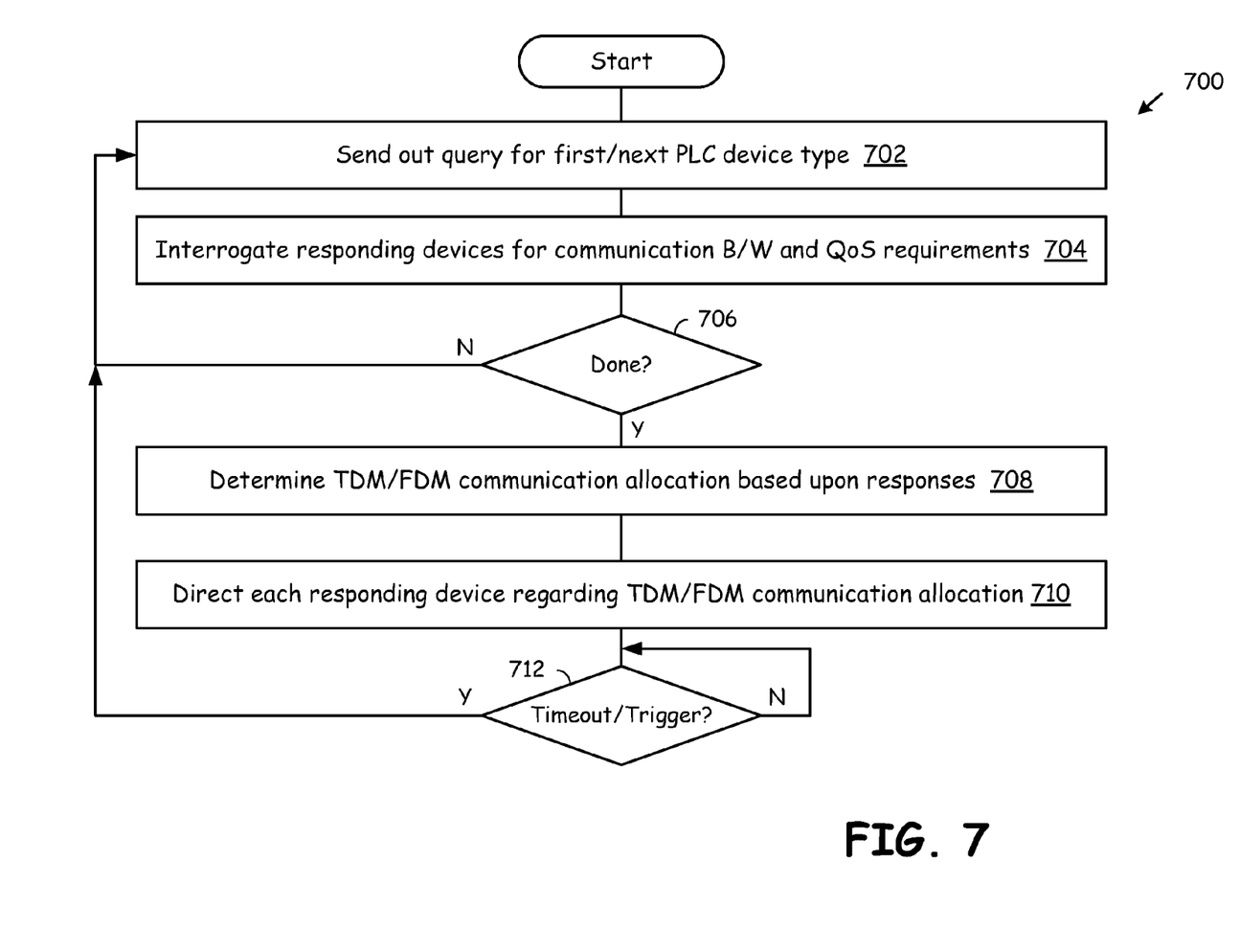
FIG. 7 is a flow chart illustrating operations according to one aspect of the present invention for managing PLC devices on shared media that support differing PLC (and other) communication standards.

FIG. 7 is a flow chart illustrating operations according to one aspect of the present invention. The operations 700 of FIG. 7 begin with the PLC device 200 sending out queries to PLC devices according to a first PLC operating specification (Step 702). The PLC device 200 then waits for devices of the particular PLC operating specification to respond and interrogates each responding device for its communication bandwidth/throughput and Quality of Service (QoS) requirements (Step 704). The PLC device 200 then determines whether it has completed querying all PLC device types (Step 706). Device types may include both narrowband and wideband device types, which have been previously described herein above. When further device type querying is required, operation returns to Step 702. When all querying is complete, operation proceeds to Step 708, where the PLC device 200 may determine Frequency domain and/or Time domain allocations for each responding device.

The PLC device 200 then directs each responding device with its corresponding Frequency domain and Time domain allocation (Step 710). The PLC device 200 then operates with this allocation until a timeout or other triggering event occurs (Step 706). When such a timeout or triggering event occurs, operation returns to Step 702, where the querying operations commence again.

In particular, the PLC device transmits a plurality of PLC queries, each PLC query respective to a particular PLC communication standard, two of the plurality of PLC queries complying with differing and incompatible PLC communication standards. The PLC queries are sent with the expectation that PLC devices sharing the PLC media and the PLC communication standard capability will respond, indicating that they are present on the PLC media. The responses may also indicate capabilities and communication requirements of the responding devices. Each supported PLC communication standard may define such a query or a similar message/beacon. For example, G.hn has a MAP message that may serve as the PLC query in some embodiments, with or without modification. Other PLC communication standards have similar messages, which serve similar purposes.

In response to the PLC queries, the PLC device receives a plurality of responses from a plurality of other PLC devices, two responses received from respective PLC devices complying with two differing and incompatible PLC communication standards. The PLC device then directs each of the two PLC devices to transmit communications of the differing and incompatible PLC communication standards in an attempt to avoid PLC communication conflicts. Alternately, the PLC device may establish non-PLC communications with a remote communications device and bridge communications between the remote PLC device and a remote non-PLC device.

The operations 700 may enable a PLC device to allocate first time slots for a first one of differing and incompatible PLC communication standards and to allocate second time slots for a second one of the differing and incompatible PLC communication standards. In such case, the first time slots would differ from the second time slots. Thus, with reference again to FIG. 3, the PLC device constructed according to the present invention may service both Homeplug and ITU G.hn communications on the same media by subdividing the times of the media used for each of the PLC communication standards to the differing and incompatible PLC communication standards. In such case, selecting the first time slots and the second time slots for allocation to the differing standards, a PLC device constructed and operating according to the present invention may consider the link quality available for each of the PLC communication standards, may consider the throughput availability of the PLC devices that support the differing incompatible PLC communication standards. Further, the PLC device in performing the operations 700 of FIG. 7 may consider the data security requirements of the one or more PLC devices sharing the PLC media and/or the data type for transmission between one or more of the PLC devices.

Referring again to FIG. 4, the operations 700 of FIG. 7 may be employed by the infrastructure 400 of FIG. 4 wherein one of the PLC devices manages the incompatible communications upon the PLC medium of the premises 400. In such case, for example, one of the PLC devices, e.g. 406, would manage communication flow between devices supporting standards 1 and 2. Likewise, another one of the PLC devices 424 would manage communications between the devices supporting PLC communication standards 1 and 3. Further, with the example of FIG. 4, the PLC device 414 that supports PLC communication standards 2 and 3 would manage communications within the premises 400 according to the standards 2 and 3. In such case, PLC devices 406, 414, and 424 would intercommunicate with one another in an effort to avoid conflict amongst the PLC devices operating according to the differing communication standards 1, 2, 3. In such case, the available communication bandwidth may be subdivided into three different recurring time slots to support communications with the three differing PLC communication standards. This technique of the operation 700 of FIG. 7 may be extended within the premises of FIG. 4 or other premises to support a further additional PLC communication standards.

Referring again to FIG. 7, the operations at step 708 may include allocating the first frequency band for a first one of differing and incompatible PLC communication standards and allocating a second frequency band for a second one of the differing and incompatible PLC communication standards. Similarly to the time division segregation that was previously described, a frequency band available for communications by PLC devices may be subdivided for use by differing PLC communication standards devices. In such cases, the determination of what frequency bands to allocate may be based on the link quality available between PLC devices, the throughput availability between PLC devices, data security requirements of the PLC devices, QoS requirements of the PLC devices, and/or the data type for transmission of the PLC devices. In such case, if PLC devices supporting a consistent same standard require high data throughput, more of an available frequency spectrum may be assigned to one of the PLC communication standards as compared to a differing one of the PLC communication standards. Further, time division multiplexing and frequency division multiplexing may also be employed to subdivide available communication capacity on PLC media for a plurality of PLC devices. Likewise, the concepts of the present invention may be extended to allow for PLC devices to support differing PLC communications standards that both use OFDM front ends but with differing communication methodologies to subdivide the tones available on the OFDM carriers for differing PLC communication standards.

With the operations 700 of FIG. 7, the PLC device 202 supports an intelligent, adaptive coexistence management PLC architecture wherein multiple PLC communication standards are allocated portions of the available bandwidth based on current demand and traffic QoS.

The operations 700 of FIG. 7 may be expanded to operate across multiple mediums accessible by the PLC device 200 of FIG. 2, acting as a network manager. In such case, the PLC device provides an adaptive management element within or via an (e.g., 1905.1) abstraction layer that optimizes overall communication flow across all underlying mediums (air, powerline, coax, telephone line, Ethernet, cellular, etc.). For example, PLC devices participating in a home environment (such as a client's pc, smart-phones, etc.) often have two or more communication means defined by differing Industry Standards such as IEEE 1901, Femtocell, MoCA, WiFi, etc. For a given situation in a specific installation, there is an optimal traffic configuration that such adaptive management element detects and directs. It does this by first gathering information about underlying node capabilities, network conditions and limitations, and underlying data-flow. Based thereon, re-allocation commands are delivered forcing migration to new configurations on the fly.

When multiple PLC devices (multiples of PLC devices 200) exist within a particular installation, operations may require Cross-Medium Coexistence. For example, where a first PLC device supports first and second PLC communication standards and a second PLC device supports third and fourth PLC communication standards and where the first and third PLC communication standards operate on the same medium in competition (via single medium coexistence sharing) or in direct conflict, an abstraction layer (e.g., similar or within IEEE 1905.1) defines that either the first or the second PLC device relinquishes all or at least some use of the corresponding first or third standard, correspondingly, and is forced to rely at least more heavily if not entirely on the second or fourth standards instead. The abstraction layer makes its decision based on (i) channel conditions underlying the first, second, third and fourth standards; (ii) node impact (cost, power, etc.); (iii) user setup or real time preferences; (iv) underlying QoS concerns, etc.

Further, a PLC device 200 of the present invention may support multi-medium Mesh operations that perform flooding and/or routing of communications across multiple mediums concurrently. In such case, the routing of data by the PLC device 200 may be performed such that data is routed across multiple data paths, e.g., two or more of PLC path, WLAN path, LAN path, MoCA path, etc. The PLC device 200 may serve as an intermediate routing node that makes media routing decisions based upon media loading, data type, QoS requirements, and other characteristics of not only the serviced transaction but the available media paths and the characteristics of each media path.

The PLC devices 200 of the present invention may also support Cross-Medium Sub-Streaming, with which a source or middling PLC device breaking data flow (stream) into sub-portions (diverging), sending such sub-portions independently across multiple mediums and finally reconstructing by a destination or further middling PLC device back into the original stream (converging). This diverging-converging process can be nested and occur many times in an overall pathway between a source and destination.

One or more PLC devices 200 of the present invention may support Virtual Bridging Across Multiple Powerline Modems. Coexistence between incompatible PLC communication standards such as HPAV and G.hn may be handled by a time domain sharing, where incompatibilities exist. Some PLC devices may support only one of such multiple standards, while others support all. One sharing approach involves a time slot allocation in an equal splitting manner, to yield periods in which a first standard device grouping operates and periods wherein a second standard device grouping operates. This sharing approach is that each device will operate only pursuant to one standard throughout.

According to another aspect of the present invention, one or more supported PLC communication standards may be "disabled' within the PLC network to avoid conflict and all nodes directed to communicate using other techniques. In such case, a PLC node may be directed to use WLAN communications instead of PLC communications when the use of the PLC communications would burden the PLC media unduly considering the benefit of allowing instantiation of the PLC communication standard. The decision to "disable" the PLC communication standard from use may be based upon the efficiency pre and post disablement, deliverable QoS pre and post disablement, throughput on a node by node basis pre and post disablement and upon other factors.

Figure 8:
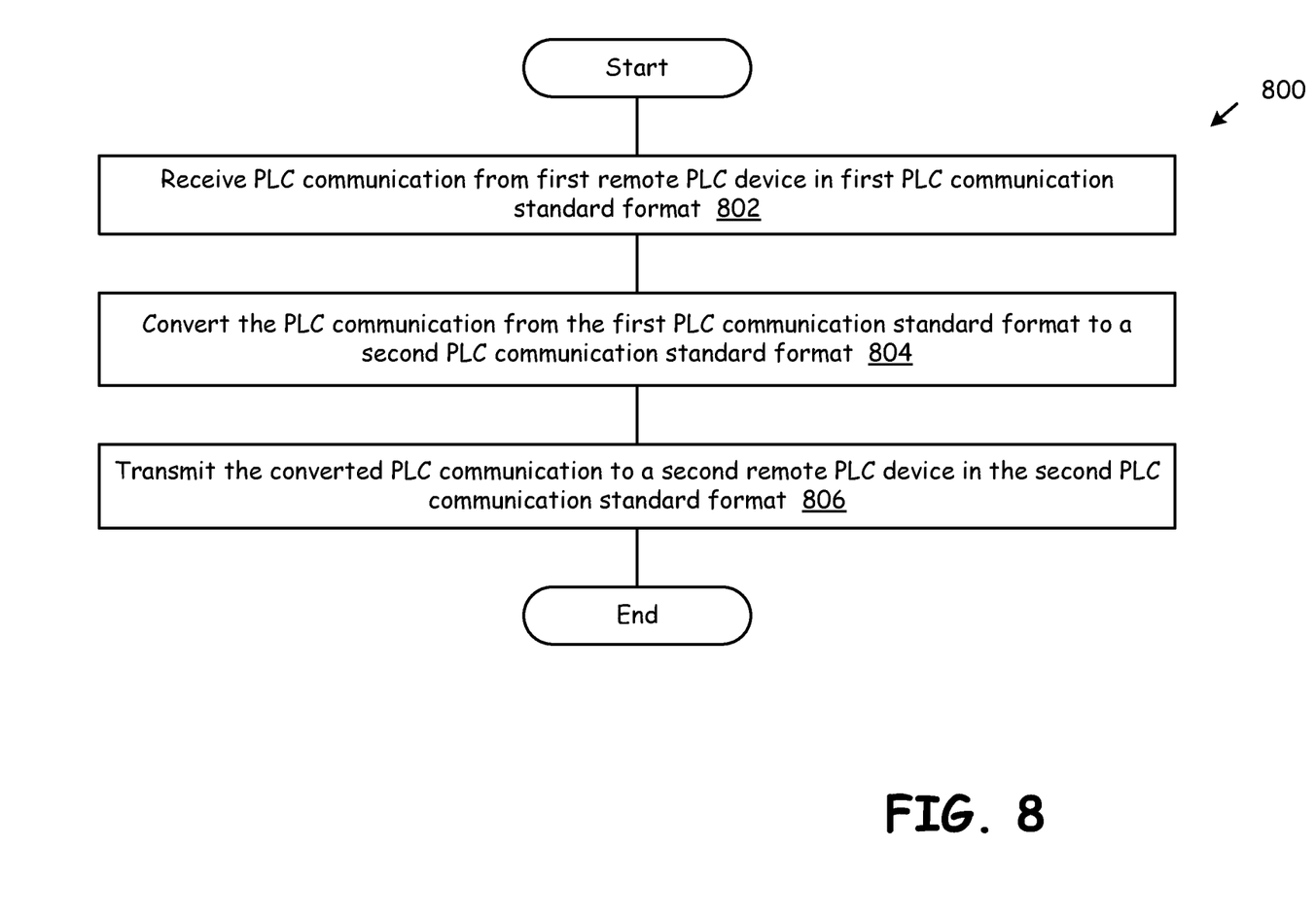
FIG. 8 is a flowchart illustrating operations according to one or more embodiments of the present invention for determining capabilities of PLC communication devices coupled thereto and for bridging communications between differing and incompatible PLC communication standards.

FIG. 8 is a flowchart illustrating operations according to one or more embodiments of the present invention for determining capabilities of PLC communication devices coupled thereto and for bridging communications between differing and incompatible PLC communication standards. Operations 800 commence with a PLC device receiving PLC communications from a first remote PLC device in a first PLC communication standard format (Step 802). The PLC device then converts the PLC communications from the first PLC communication standard format to a second PLC communication standard format (Step 804). Then, the PLC device transmits the converted PLC communications to a second remote PLC device in the second PLC communication standard format (Step 806).

Referring again to FIG. 4, PLC device 406 may bridge communications between PLC device 402 and PLC device 410. In such case, because the PLC device 402 only supports PLC communication standard 1 and PLC device 410 only supports PLC communication standard 2. PLC device 406, supporting both standards 1 and 2, bridges PLC communications between the PLC devices 402 and 410 according to the operations 700 of FIG. 7. Such bridging may occur unidirectionally or bidirectionally, based upon the particular operation employed.

Figure 9:
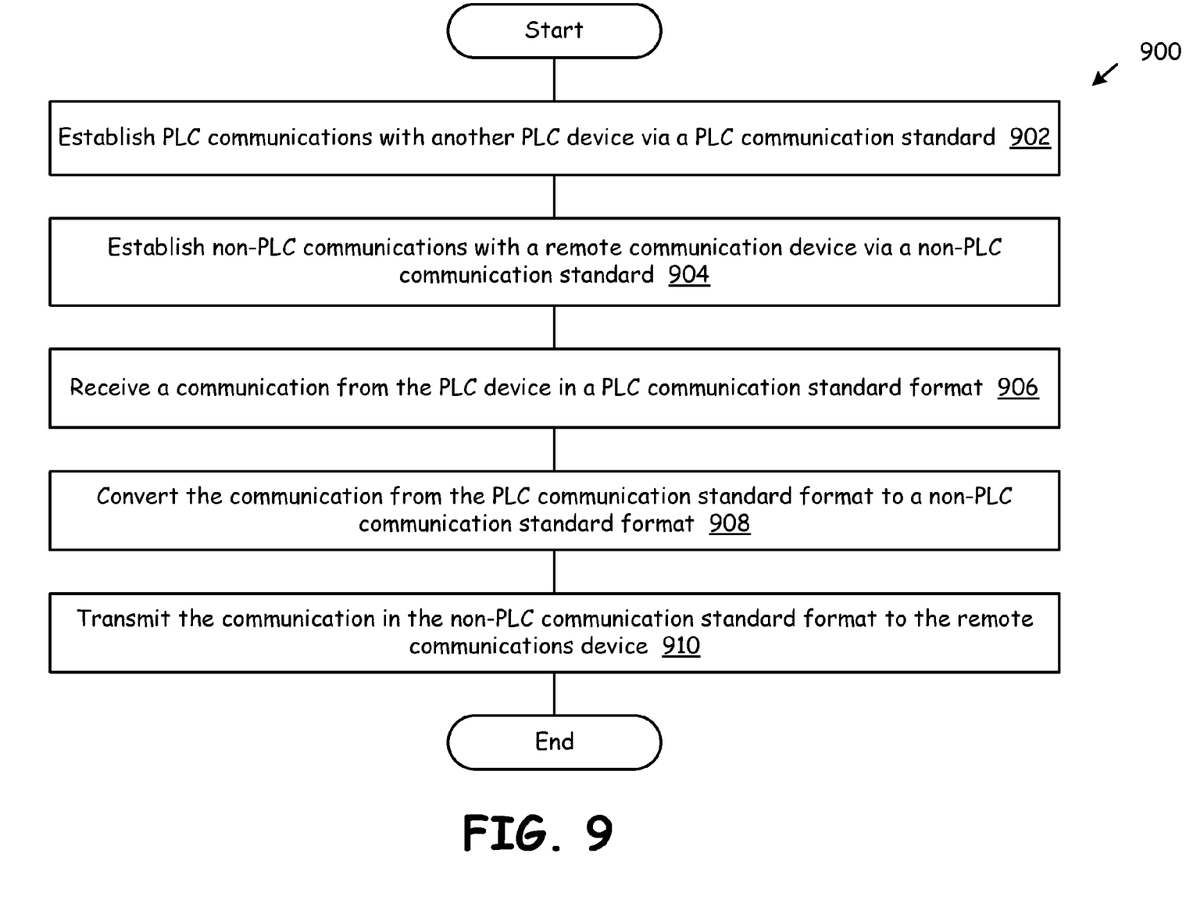
FIG. 9 is a flowchart illustrating operations according to one or more embodiments of the present invention for servicing communications using both PLC communication standard format communications and non-PLC communication standard format communications.

FIG. 9 is a flowchart illustrating operations according to one or more embodiments of the present invention for servicing communications using both PLC communication standard format communications and non-PLC communication standard format communications. Operations 900 commence with a PLC device establishing PLC communications with another PLC device via a PLC communication standard format (Step 902). Then, the PLC device establishes non-PLC communications with a remote communication device via a non-PLC communication standard (Step 904). The non-PLC communication standards may be one or more of LAN communications, WWAN communications, WLAN communications, coaxial communications, millimeter wave communications, cellular telephony communications, near field communications, infrared communications, and/or optical communications. In such case, the usage of non-PLC with reference to FIG. 9 indicates only that the non-PLC communications do not operate according to a PLC communications standard.

Operation 900 continues with the PLC device receiving a communication from the other PLC device in a PLC communication standard format (Step 906). The PLC device then converts the communication from the PLC communication standard format to a non-PLC communication standard format (Step 908). Then, the PLC device transmits the communication in the non-PLC communication standard format to the remote communications device (Step 910). In such case, the communications transmitted according to one of the communication types previously described.

The operations 900 of FIG. 9 may be employed with one or more of the devices of the premises 400 of FIG. 4. In such case, PLC device 424 receives a PLC communication in a PLC communication standard format 1 and converts the PLC communication to a WLAN communication to thereby transmit the communication to a remote device that supports WLAN communications, e.g. 428. Likewise, one of the PLC devices of FIG. 4 may receive a communication in a WLAN or another communication format, convert that communication to a PLC communication format, and transmit the communication via the PLC media to another PLC device.

According to another aspect of the PLC/non-PLC bridging operation of the present invention, upstream communications may be transmitted in one format and downstream communications may be transmitted in another format. For example, if the PLC communications may be transmitted at a higher data throughput rate, downstream communications may be transmitted via the PLC media. Further, the upstream communications may have a lesser throughput rate and may be transmitted via a non-PLC communication standard format, e.g. WLAN communications. These principles may be expanded further with differing communication types to subdivide between PLC communications and non-PLC communications.

Figure 10:
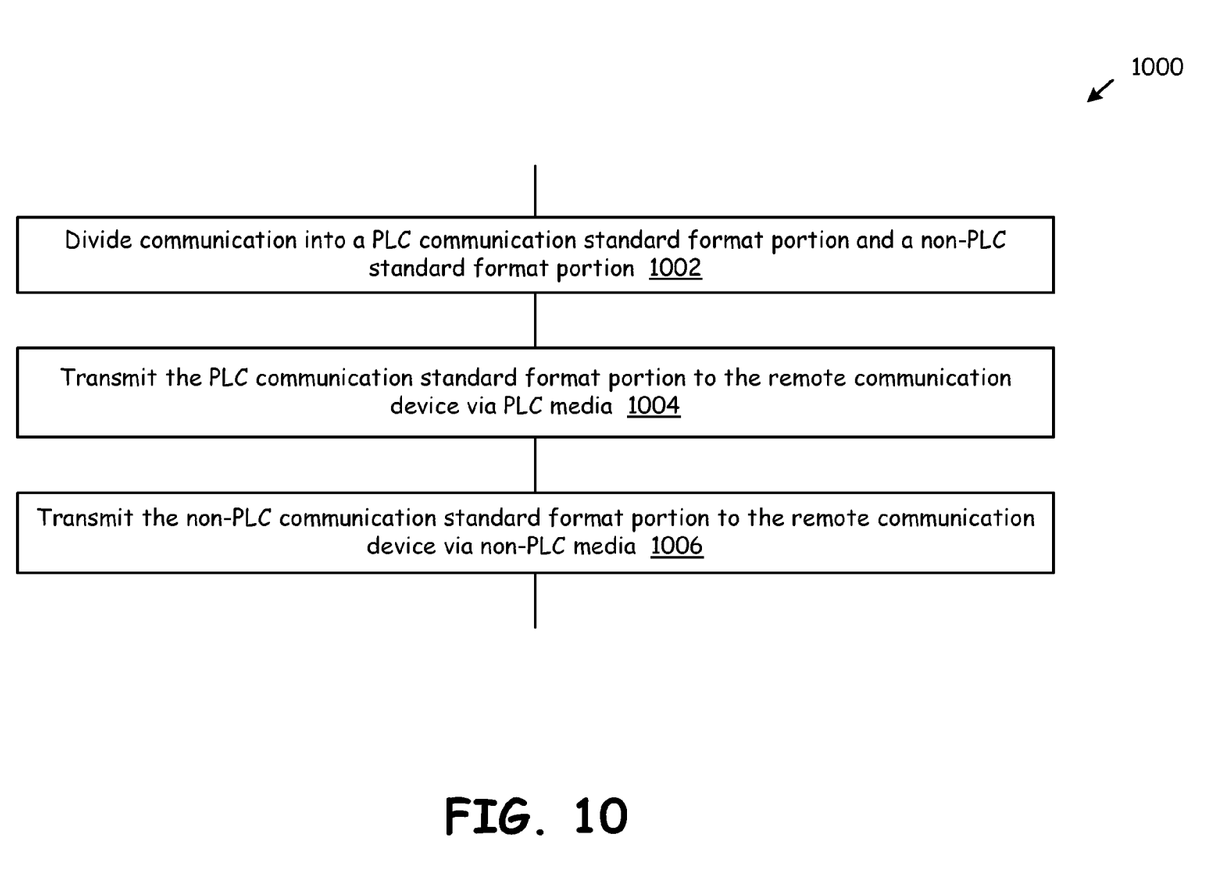
FIG. 10 is a flowchart illustrating operations according to one or more embodiments of the present invention for concurrently using PLC and non-PLC communications to service a single communication.

FIG. 10 is a flowchart illustrating operations according to one or more embodiments of the present invention for concurrently using PLC and non-PLC communications to service a single communication. Operations 1000 commence with splitting a communication into a PLC communication standard format portion and a non-PLC communication standard format portion (Step 1002). The non-PLC communication standard format may be one of those types previously described herein. Then, operation 1000 continues with transmitting the PLC communication standard format portion to a remote communications device via PLC media (Step 1004). Operations 1000 continue with transmitting the non-PLC communication standard format portion to the remote communications device via non-PLC media (Step 1006). The operations of steps 1004 and 1006 may be performed simultaneously such that communications transmitted on the PLC media and the non-PLC media occur simultaneously or sequentially, either step 1004 or step 1006 occurring first.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention.

The invention claimed is:

1. A Powerline Communications (PLC) device comprising:
   a processing module;
   memory coupled to the processing module;
   a PLC interface coupled to the processing module, wherein the processing module, the PLC interface, and the memory are operable to:
      transmit a plurality of PLC queries, two of the plurality of PLC queries complying with differing and incompatible PLC communication standards;
      receive a plurality of responses from a plurality of other PLC devices, two responses received from respective PLC devices complying with two differing and incompatible PLC communication standards; and
      direct each of the two PLC devices to transmit communications of the differing and incompatible PLC communication standards in an attempt to avoid PLC communication conflicts.

2. The PLC device of claim 1, wherein the processing module, the PLC interface, and the memory are further operable to:
   receive PLC communications from a first PLC device in a first PLC communication standard format;
   convert the PLC communications from the first PLC communication standard format to a second PLC communication standard format; and
   transmit the converted PLC communications to a second PLC device in the second PLC communication standard format.

3. The PLC device of claim 1, wherein:
   a first one of the differing and incompatible PLC communication standards comprises a HomePlug communication standard; and
   a second one of the differing and incompatible PLC communication standards comprises an ITU home networking (G.hn) communication standard.

4. The PLC device of claim 1, wherein in directing each of the two PLC devices to transmit communications of the differing and incompatible PLC communication standards in an attempt to avoid PLC communication conflicts, the processing module, the PLC interface, and the memory are operable to:
   allocate first time slots for a first one of the differing and incompatible PLC communication standards; and allocate second time slots for a second one of the differing and incompatible PLC communication standards, wherein the first time slots differ from the second time slots.

5. The PLC device of claim 4, wherein the first time slots and second time slots are selected based upon at least one of:
   link quality with one or more of the other PLC devices;
   throughput availability with one or more of the other PLC devices;
   data security requirements of the one or more of the other PLC devices;
   Quality of Service requirements of the one or more of the other PLC devices; and
   data type for transmission to one or more of the other PLC devices.

6. The PLC device of claim 1, wherein in directing each of the two PLC devices to transmit communications of the differing and incompatible PLC communication standards in an attempt to avoid PLC communication conflicts, the processing module, the PLC interface, and the memory are operable to:
   allocate a first frequency band for a first one of the differing and incompatible PLC communication standards; and
   allocate a second frequency band for a second one of the differing and incompatible PLC communication standards, wherein the first frequency band differs from the second frequency band.

7. The PLC device of claim 6, wherein the first frequency band and the second frequency band are selected based upon at least one of:
   link quality with one or more of the other PLC devices;
   throughput availability with one or more of the other PLC devices;
   data security requirements of the one or more of the other PLC devices;
   Quality of Service requirements of the one or more of the other PLC devices; and
   data type for transmission to one or more of the other PLC devices.

8. The PLC device of claim 1, wherein the processing module, the PLC interface, and the memory are further operable to divide communications with a remote PLC device between a first PLC communication standard format and a second PLC communication standard format.

9. The PLC device of claim 1, wherein the differing and incompatible PLC communication standards are selected from the group consisting of the Homeplug 1.0/1.1 standards, the Homeplug AV standards, the CEPCA standards, the Digital Home Standards, the IEEE 1901 standards, and the ITU-T G.9960 standards.

10. The PLC device of claim 8, wherein the first PLC communication standard and the second PLC communication standard are selected from the group consisting of the Homeplug 1.0/1.1 standards, the Homeplug AV standards, the CEPCA standards, the Digital Home Standards, the IEEE 1901 standards, and the ITU-T G.9960 standards.

11. A method for operating a Powerline Communications (PLC) device comprising:
   transmitting a plurality of PLC queries, two of the plurality of PLC queries complying with differing and incompatible PLC communication standards;
   receiving a plurality of responses from a plurality of other PLC devices, two responses received from respective PLC devices complying with two differing and incompatible PLC communication standards; and
   directing each of the two PLC devices to transmit communications of the differing and incompatible PLC communication standards in an attempt to avoid PLC communication conflicts.

12. The method of claim 11, further comprising:
   receiving PLC communications from a first PLC device in a first PLC communication standard format;
   converting the PLC communications from the first PLC communication standard format to a second PLC communication standard format; and
   transmitting the converted PLC communications to a second PLC device in the second PLC communication standard format.

13. The method of claim 11, wherein:
   a first one of the differing and incompatible PLC communication standards comprises a HomePlug communication standard; and
   a second one of the differing and incompatible PLC communication standards comprises an ITU home networking (G.hn) communication standard.

14. The method of claim 11, wherein directing each of the two PLC devices to transmit communications of the differing and incompatible PLC communication standards in an attempt to avoid PLC communication conflicts comprises:
   allocating first time slots for a first one of the differing and incompatible PLC communication standards; and
   allocating second time slots for a second one of the differing and incompatible PLC communication standards, wherein the first time slots differ from the second time slots.

15. The method of claim 14, wherein the first time slots and the second time slots are selected based upon at least one of:
   link quality with one or more of the other PLC devices;
   throughput availability with one or more of the other PLC devices;
   data security requirements of the one or more of the other PLC devices;
   Quality of Service requirements of the one or more of the other PLC devices; and
   data type for transmission to one or more of the other PLC devices.

16. The method of claim 11, wherein directing each of the two PLC devices to transmit communications of the differing and incompatible PLC communication standards in an attempt to avoid PLC communication conflicts comprises:
   allocating a first frequency band for a first one of the differing and incompatible PLC communication standards; and
   allocating a second frequency band for a second one of the differing and incompatible PLC communication standards, wherein the first frequency band differs from the second frequency band.

17. The method of claim 16, wherein the first frequency band and second frequency band are selected based upon at least one of:
   link quality with one or more of the other PLC devices;
   throughput availability with one or more of the other PLC devices;
   data security requirements of the one or more of the other PLC devices;
   Quality of Service requirements of the one or more of the other PLC devices; and
   data type for transmission to one or more of the other PLC devices.

18. The method of claim 11, further comprising dividing communications with a remote PLC device between a first PLC communication standard format and a second PLC communication standard format.

19. The method of claim 11, wherein the differing and incompatible PLC communication standards are selected from the group consisting of the Homeplug 1.0/1.1 standards, the Homeplug AV standards, the CEPCA standards, the Digital Home Standards, the IEEE 1901 standards, and the ITU-T G.9960 standards.

20. The method of claim 18, wherein the first PLC communication standard and the second PLC communication standard are selected from the group consisting of the Homeplug 1.0/1.1 standards, the Homeplug AV standards, the CEPCA standards, the Digital Home Standards, the IEEE 1901 standards, and the ITU-T G.9960 standards.

21. A Powerline Communications (PLC) device comprising:
a processing module;
memory coupled to the processing module;
a wireless interface coupled to the processing module; and
a PLC interface coupled to the processing module, wherein the processing module, the PLC interface, and the memory are operable to:
 transmit a plurality of PLC queries, two of the plurality of PLC queries complying with differing and incompatible PLC communication standards;
 receive a plurality of responses from a plurality of other PLC devices, two responses received from respective PLC devices complying with two differing and incompatible PLC communication standards; and
 direct each of the two PLC devices to transmit communications of the differing and incompatible PLC communication standards in an attempt to avoid PLC communication conflicts.

22. The PLC device of claim 21, wherein the processing module, the PLC interface, and the memory are further operable to:
 receive PLC communications from a first PLC device in a first PLC communication standard format;
 convert the PLC communications from the first PLC communication standard format to a second PLC communication standard format; and
 transmit the converted PLC communications to a second PLC device in the second PLC communication standard format.

23. The PLC device of claim 21, wherein:
 a first one of the differing and incompatible PLC communication standards comprises a HomePlug communication standard; and
 a second one of the differing and incompatible PLC communication standards comprises an ITU home networking (G.hn) communication standard.

24. The PLC device of claim 21, wherein in directing each of the two PLC devices to transmit communications of the differing and incompatible PLC communication standards in an attempt to avoid PLC communication conflicts, the processing module, the PLC interface, and the memory are operable to:
 allocate first time slots for a first one of the differing and incompatible PLC communication standards; and
 allocate second time slots for a second one of the differing and incompatible PLC communication standards, wherein the first time slots differ from the second time slots.

* * * * *